US011036553B2

(12) United States Patent
Zhang et al.

(10) Patent No.: US 11,036,553 B2
(45) Date of Patent: Jun. 15, 2021

(54) PREEMPTING OR TRAVERSING ALLOCATED RESOURCE APPLICATIONS BASED ON JOB PRIORITY AND RESOURCE DEMAND INFORMATION

(71) Applicant: Alibaba Group Holding Limited, Grand Cayman (KY)

(72) Inventors: Yang Zhang, Beijing (CN); Yihui Feng, Beijing (CN); Jin Ouyang, Beijing (CN); Qiaohuan Han, Beijing (CN); Fang Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 192 days.

(21) Appl. No.: 15/619,405

(22) Filed: Jun. 9, 2017

(65) Prior Publication Data

US 2017/0357531 A1 Dec. 14, 2017

(30) Foreign Application Priority Data

Jun. 13, 2016 (CN) .......................... 201610410884.7

(51) Int. Cl.
*G06F 9/50* (2006.01)

(52) U.S. Cl.
CPC .......... *G06F 9/5005* (2013.01); *G06F 9/5016* (2013.01); *G06F 9/5027* (2013.01); *G06F 2209/503* (2013.01); *G06F 2209/5021* (2013.01)

(58) Field of Classification Search
None
See application file for complete search history.

(56) References Cited

U.S. PATENT DOCUMENTS 5,963,911 A    10/1999   Walker et al.
6,260,058 B1 *   7/2001   Hoenninger .......... G06F 9/4887
                                                          718/103

(Continued)

FOREIGN PATENT DOCUMENTS

CN          1801813 A      7/2006
CN      101916209 A    12/2010

(Continued)

OTHER PUBLICATIONS

Baker, "A Stack-Based Resource Allocation Policy for Realtime Processes", retrieved on Jul. 27, 2017 at <<http://www.cs.cmu.edu/~ssaewong/research/srp.pdf>>, 11th Real-Time Systems Symposium, 1990, pp. 191-200.

(Continued)

*Primary Examiner* — Meng Ai T An
*Assistant Examiner* — Zujia Xu
(74) *Attorney, Agent, or Firm* — Lee & Hayes, P.C.

(57) ABSTRACT

A priority-based resource allocation method, includes accepting a resource application submitted by a job, the resource application including resource demand information and job priority information; determining, according to the resource demand information of the resource application, whether remaining resources of a system meet the resource application, and traversing, in an allocated resource application queue when the remaining resources do not meet the resource application, allocated resource applications having job priorities lower than that of the resource application; using the sum of system resources occupied by all traversed resource applications plus the remaining resources as available resources; and stopping traversing when the available resources meet the resource application, and allocating the available resources to the resource application. The technical solution of the present disclosure enables a resource (Continued)

application having a high job priority to preempt resources of a resource application having a low job priority.

17 Claims, 6 Drawing Sheets

(56) References Cited

U.S. PATENT DOCUMENTS

| | | | |
|---|---|---|---|
| 7,284,244 B1* | 10/2007 | Sankaranarayan ... | G06F 9/5027 718/103 |
| 7,339,942 B2 | 3/2008 | Morgan et al. | |
| 7,953,000 B2 | 5/2011 | Baker et al. | |
| 8,639,772 B2 | 1/2014 | Gentile et al. | |
| 8,640,137 B1 | 1/2014 | Bostic et al. | |
| 8,773,998 B2 | 7/2014 | Polk et al. | |
| 9,003,037 B2 | 4/2015 | Beveridge | |
| 9,128,883 B2 | 9/2015 | Gokhale et al. | |
| 2001/0031634 A1* | 10/2001 | Mizutani ............... | H04W 72/10 455/425 |
| 2005/0097556 A1 | 5/2005 | Code et al. | |
| 2006/0206894 A1 | 9/2006 | Jung et al. | |
| 2009/0025004 A1 | 1/2009 | Barnard et al. | |
| 2009/0113438 A1 | 4/2009 | Barness et al. | |
| 2012/0198461 A1* | 8/2012 | Saxe ..................... | G06F 9/5027 718/103 |
| 2012/0204185 A1 | 8/2012 | Cham et al. | |
| 2013/0067089 A1* | 3/2013 | Synytskyy ............. | G06F 9/485 709/226 |
| 2013/0310056 A1* | 11/2013 | Cabrera ................. | H04W 4/00 455/450 |
| 2013/0311686 A1 | 11/2013 | Fetterman et al. | |
| 2013/0339969 A1 | 12/2013 | Koski et al. | |
| 2014/0351562 A1* | 11/2014 | Spadini ................. | G06F 9/3836 712/214 |
| 2015/0143381 A1* | 5/2015 | Chin ..................... | G06F 9/5005 718/104 |
| 2016/0147564 A1 | 5/2016 | Marr et al. | |
| 2017/0010986 A1* | 1/2017 | Coddington ........ | G06F 13/1642 |
| 2018/0052711 A1* | 2/2018 | Zhou ..................... | G06F 9/46 |

FOREIGN PATENT DOCUMENTS

| | | |
|---|---|---|
| CN | 102546759 A | 7/2012 |
| CN | 103699445 A | 4/2014 |
| CN | 104079503 A | 10/2014 |
| CN | 104317650 A | 1/2015 |

OTHER PUBLICATIONS

PCT Search Report and Written Opinion dated Aug. 23, 2017 for PCT Application No. PCT/US17/36894, 13 pages.

Urgaonkar, et al., "Dynamic resource allocation and power management in virtualized data centers", retrieved on Jul. 27, 2017 at <<https://www.researchgate.net/profile/Ulas_Kozat/publication/220708034_Dynamic_resource_allocation_and_power_management_in_virtualized_data_centers/links/0fcfd50ad7cfd2fcf9000000.pdf>>, 2010 IEEE Network Operations and Management Symposium, 2010, pp. 1-8.

Translation of CN Office Action from Corresponding CN Application No. 201610410884.7 dated Mar. 11, 2020, a counterpart foreign application for U.S. Appl. No. 15/619,405 , 17 pages.

Translation of CN Search Report from Corresponding CN Application No. 201610410884.7 dated Jan. 7, 2020, a counterpart foreign application for U.S. Appl. No. 15/619,405 , 2 page.

Translation of Office Action dated Aug. 11, 2020, from corresponding CN Patent Application No. 201610410884.7, 17 pages.

Translation of CN Search Report from corresponding CN Application No. 201610410884.7 dated Mar. 12, 2021, a counterpart foreign application for U.S. Appl. No. 15/619,405 , 1 page.

* cited by examiner

RESOURCE APPLICATION A
RESOURCE APPLICATION VOLUME: CPU: 1, MEMORY: 1
RESOURCE APPLICATION QUANTITY: 20
ALLOCATED RESOURCES: CPU: 20, MEMORY: 20
JOB PRIORITY: 3

302

RESOURCE APPLICATION B
RESOURCE APPLICATION VOLUME: CPU: 3, MEMORY: 2
RESOURCE APPLICATION QUANTITY: 20
ALLOCATED RESOURCES: CPU: 60, MEMORY: 40
JOB PRIORITY: 2

304

RESOURCE APPLICATION C
RESOURCE APPLICATION VOLUME: CPU: 2, MEMORY: 1
RESOURCE APPLICATION QUANTITY: 10
ALLOCATED RESOURCES: CPU: 20, MEMORY: 10
JOB PRIORITY: 1

306

ALLOCATED RESOURCE APPLICATION QUEUE
308

PREEMPTING OR TRAVERSING ALLOCATED RESOURCE APPLICATIONS BASED ON JOB PRIORITY AND RESOURCE DEMAND INFORMATION

CROSS REFERENCE TO RELATED PATENT APPLICATIONS

This application claims priority to Chinese Patent Application No. 201610410884.7, filed on Jun. 13, 2016, entitled "PRIORITY-BASED RESOURCE ALLOCATION METHOD, APPARATUS AND DEVICE," which is hereby incorporated by reference in its entirety.

TECHNICAL FIELD

The present disclosure relates to the field of computer technologies, and, in particular, to a priority-based resource allocation method, and corresponding to the above method, the present disclosure further relates to a priority-based resource allocation apparatus and device.

BACKGROUND

In a distributed system, there are generally three roles: a resource scheduler, a job manager and subordinate job nodes, and machine nodes. When a user needs to submit a job, the job manager may apply for a certain amount of machine resources, such as CPU and memory, from the resource scheduler for a job node to use. After receiving a job resource application, the resource scheduler may calculate, according to the remaining available resources in the distributed system, a list of available resources that can be allocated to the job manager, such that a 1-core CPU and 1 GB memory are available on a machine A, and a 2-core CPU and 2 GB memory are available on a machine B. Then, the resource scheduler may send the resource list to the job manager and a corresponding machine node.

Figure 1:
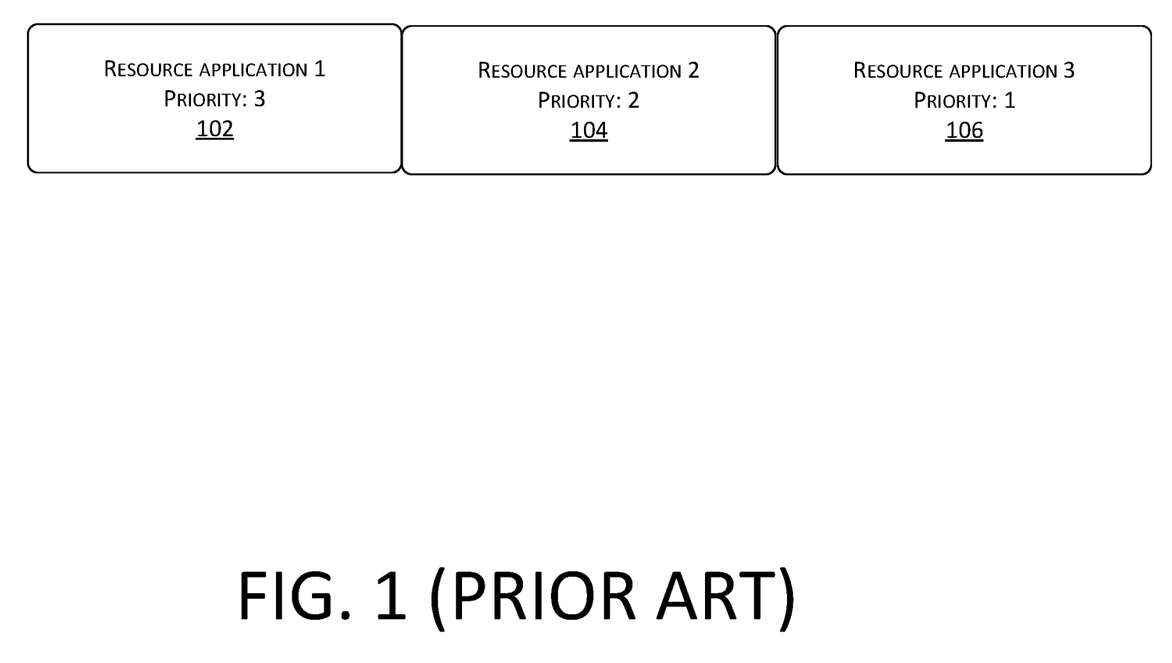
FIG. 1 is a schematic diagram of a resource application queue as a comparison art.

In a distributed system, there may be tens of thousands of job managers, and job priorities of resource applications of these job managers are generally different. Some job managers have resource applications with higher job priorities, and need to be allocated with resources preferentially by the resource scheduler. Some job managers have resource applications with lower job priorities, indicating that they can tolerate that the resource scheduler preferentially allocates resources to other resource applications having higher job priorities. Such a situation that resource applications queue up due to exhaustion of overall cluster resources may usually occur in a distributed system. A common solution is queuing requests according to priorities, and then periodically extracting a resource request from the queue for resubmission. As shown in FIG. 1, in a waiting queue, a resource request having a high job priority may be queued in the front, and a resource request having a low priority may be queued behind. In FIG. 1, for example, the waiting que includes a resource application 1 with priority 3 (102), a resource application 2 with priority 2 (104), and a resource application 3 with priority 1 (106).

However, the above method cannot solve the following problems: the resource scheduler receives a resource application having an extremely high priority in the case where the overall cluster resources are exhausted, and this resource application needs to obtain resources immediately; however, because it needs to take quite a long period of time to execute all resource applications that have been met, even though the job priority of the resource application is very high, resources cannot be allocated to the resource application until other resource applications having low job priorities return resources. In this case, the resource scheduler needs to support that a resource application having a high job priority can acquire resources that have been obtained by a resource application having a low job priority.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a priority-based resource allocation method, enabling a resource application having a high job priority to preempt resources of a resource application having a low job priority, such that system resources are effectively utilized.

The present disclosure provides a priority-based resource allocation method, including:

accepting a resource application submitted by a job, the resource application including resource demand information and job priority information;

determining, according to the resource demand information of the resource application, whether remaining resources of a system meet the resource application, and sequentially traversing, in an allocated resource application queue when the remaining resources do not meet the resource application, allocated resource applications having job priorities lower than that of the resource application, the allocated resource applications being resource applications that have been completely or partially allocated with resources;

forming traversed resource applications by using all the traversed allocated resource applications, and using the sum of system resources occupied by all the traversed resource applications plus the remaining resources as available resources; and determining, every time one of the allocated resource applications is traversed, whether the available resources meet the resource application, stopping traversing when the available resources meet the resource application, and allocating the available resources to the resource application.

Optionally, in the process of determining, according to the resource demand information of the resource application, whether remaining resources of a system meet the resource application, if the remaining resources meet the resource application, corresponding resources are allocated to the job according to the resource demand information of the resource application; and the resource application is recorded into the allocated resource application queue as the allocated resource application.

Optionally, the determining, every time one of the allocated resource applications is traversed, whether the available resources meet the resource application further includes: if the available resources cannot meet the resource application, continuing traversing until the available resources meet the resource application.

Optionally, the determining, every time one of the allocated resource applications is traversed, whether the available resources meet the resource application further includes: allocating partial resources to the resource application if the available resources still cannot meet the resource application after all the allocated resource applications having low job priorities are traversed.

Optionally, the stopping traversing when the available resources meet the resource application, and allocating the available resources to the resource application includes:

stopping traversing when the available resources meet the resource application, and allocating the available resources to the resource application; and allocating, according to a sequence of the job priorities from high to low, second remaining resources after the allocation to the traversed resource applications, the second remaining resources being system resources that remain after the available resources are allocated to the resource application.

Optionally, the stopping traversing when the available resources meet the resource application, and allocating the available resources to the resource application includes:

stopping traversing if the available resources meet the resource application, and further determining whether the second remaining resources meet any one of the traversed resource applications, if yes, allocating the available resources to the resource application, and allocating the second remaining resources to any one of the traversed resource applications.

Optionally, the stopping traversing when the available resources meet the resource application, and allocating the available resources to the resource application includes:

stopping traversing if the available resources meet the resource application, and further determining whether the second remaining resources meet any one of the traversed resource applications, if yes, allocating remaining available resources, excluding resources occupied by any one of the traversed resource applications, to the resource application.

Optionally, the allocating partial resources to the resource application includes:

allocating the remaining resources to the resource application, an unmet part of the resource application entering a to-be-allocated resource application queue to wait for next resource allocation; and allocating the remaining part of the available resources after the available resources are allocated to the resource application to the traversed resource applications according to a sequence of the job priorities from high to low.

Optionally, the allocating partial resources to the resource application includes:

keeping system resources occupied by the allocated resource applications unchanged, and allocating the remaining resources to the resource application when the available resources still cannot meet the resource application after all the allocated resource applications having low job priorities are traversed, an unmet part of the resource application entering a to-be-allocated resource application queue to wait for next resource allocation.

Optionally, the resource application includes a resource application name, a resource application volume, a resource application quantity, and a job priority;

the resource application name is a label name of the resource application;

the resource application volume is the minimum resource occupation needed for running the job corresponding to the resource application;

the resource application quantity is the quantity of the resource application volumes that the resource application applies for; and the job priority is a definite quantity of priority levels defined by a user; if the priority level is higher, it indicates that the corresponding job is more important, and the resource application should be met more preferentially; if the priority levels are the same, the resource application submitted earlier in a time sequence should be met more preferentially.

Optionally, the job priorities are clustered into different priority intervals according to a set dimension; and the sequentially traversing, in an allocated resource queue, allocated resource applications having job priorities lower than that of the job resource application includes:

traversing, in the allocated resource queue according to a sequence of the job priorities from low to high, all the allocated resource applications of which priority intervals are lower than a priority interval of the resource application.

Optionally, the sequentially traversing, in an allocated resource queue, allocated resource applications having job priorities lower than that of the resource application includes:

traversing, in the allocated resource queue according to a sequence of the job priorities from low to high, all allocated resource applications having job priorities lower than that of the resource application.

Optionally, the allocated resource queue is a set of allocated resource applications that have been completely or partially allocated with resources and are arranged according to the sequence of the job priorities.

Optionally, the allocated resource application includes the resource application name, the resource application volume, an allocated resource quantity, allocated resources, and the job priority;

the allocated resource quantity is the quantity of the resource application volumes that have been allocated to the resource application; and the allocated resources are a product of the resource application volume and the allocated resource quantity.

Optionally, the to-be-allocated resource application queue is a set of to-be-allocated resource applications that are completely or partially not allocated with resources and arranged according to the job priorities; the application includes the resource application name, the resource application volume, the resource application quantity, a to-be-allocated resource quantity, and the job priority.

A priority-based resource allocation apparatus includes: a resource application receiving unit, and a resource preemption unit;

the resource application receiving unit is configured to accept a resource application submitted by a job, the resource application including resource demand information and job priority information; and determine, according to the resource demand information of the resource application, whether remaining resources of a system meet the resource application, and if the remaining resources do not meet the resource application, trigger the resource preemption unit.

Optionally, the priority-based resource allocation apparatus further includes a resource allocation unit;

it is determined, according to the resource demand information of the resource application, whether the remaining resources of the system meet the resource application, and if the remaining resources meet the resource application, the resource allocation unit is entered; and the resource allocation unit is configured to allocate, according to the resource demand information of the job, corresponding resources to the resource application; and record the resource application into an allocated resource application queue as an allocated resource application.

Optionally, the resource preemption unit includes a traversing sub-unit, and a traversing post-processing sub-unit;

the traversing sub-unit is configured to traverse, in the allocated resource queue according to a sequence of the job priorities from low to high, the allocated resource applications having job priorities lower than that of the resource application; determine, every time one of the allocated resource applications is traversed, whether the available resources meet the resource application; stop traversing if the available resources meet the resource application, and allocate the available resources to the job; and continue traversing, if the available resources cannot meet the resource application, until the available resources meet the resource application; and the traversing post-processing sub-unit is configured to process a situation in which the available resources still cannot meet the resource application after the traversing.

Optionally, in the traversing sub-unit, the stopping traversing if the available resources meet the resource application, and allocating the available resources to the resource application includes:
    stopping traversing if the available resources meet the resource application, and allocating the available resources to the resource application; and allocating, according to a sequence of the job priorities from high to low, second remaining resources after the allocation to the traversed resource applications.

Optionally, in the traversing sub-unit, the stopping traversing if the available resources meet the resource application, and allocating the available resources to the resource application includes:
    stopping traversing if the available resources meet the resource application, and further determining whether the second remaining resources meet any one of the traversed resource applications, if yes, allocating the available resources to the resource application, and allocating the second remaining resources to any one of the traversed resource applications.

Optionally, in the traversing sub-unit, the stopping traversing if the available resources meet the resource application, and allocating the available resources to the resource application includes:
    stopping traversing if the available resources meet the resource application, and further determining whether the second remaining resources meet any one of the traversed resource applications, if yes, allocating remaining available resources, excluding resources occupied by any one of the traversed resource applications, to the resource application.

Optionally, the traversing post-processing sub-unit is configured to:
    allocate the available resources to the resource application when the available resources still cannot meet the resource application after all the allocated resource applications having low job priorities are traversed, an unmet part of the resource application entering a to-be-allocated resource application queue to wait for next resource allocation; and
    allocate the remaining part of the available resources after the available resources are allocated to the resource application to the allocated traversed resource applications, of which resources are preempted, according to a sequence of the job priorities from high to low.

Optionally, the traversing post-processing sub-unit is configured to:
    keep system resources occupied by the allocated resource applications unchanged, and allocate the remaining resources to the resource application when the available resources still cannot meet the resource application after all the allocated resource applications having low job priorities are traversed, an unmet part of the resource application entering the to-be-allocated resource application queue to wait for next resource allocation.

Optionally, the resource application submitted by the resource application receiving unit includes: a resource application name, a resource application volume, a resource application quantity, and a job priority.

An electronic device is provided, where the electronic device includes:
    a display;
    a processor; and
    a memory configured to store a priority-based resource allocation program, the program, when being read and executed by the processor, performing the following operations:
    accepting a resource application submitted by a job, the resource application including resource demand information and job priority information;
    determining, according to the resource demand information of the resource application, whether remaining resources of a system meet the resource application, and if yes, allocating corresponding resources to the job according to the resource demand information of the resource application; and recording the resource application into an allocated resource application queue as an allocated resource application;
    if no, traversing, in the allocated resource application queue according to a sequence of job priorities from low to high, the allocated resource applications having job priorities lower than that of the resource application;
    forming traversed resource applications by using all the traversed allocated resource applications, and using the sum of system resources occupied by all the traversed resource applications plus the remaining resources as available resources; determining, every time one of the allocated resource applications is traversed, whether the available resources meet the resource application; stopping traversing if the available resources meet the resource application, and allocating the available resources to the resource application; continuing traversing, if the available resources cannot meet the resource application, until the available resources meet the resource application; or continuing traversing till all the allocated resource applications having low job priorities are traversed, and allocating resources to the resource application.

Optionally, the electronic device includes processors and one or more memories stored thereon a priority-based resource allocation program that, when executed by the processor, performing operations comprising:
    receiving a resource application submitted by a job, the resource application including resource demand information and job priority information, the job priority information including a priority level and a priority interval that includes multiple priority levels;

determining, according to the resource demand information of the resource application, whether remaining resources meet the resource application;

sequentially traversing, in an allocated resource application queue, allocated resource applications having priority intervals lower than that of the resource application in response to determining that the remaining resources do not meet the resource application, the allocated resource applications being resource applications that have been completely or partially allocated with resources;

determining not to preempt or traverse an allocated resource application having a priority interval same as that of the resource application and a priority level different from that of the resource application;

forming traversed resource applications by using the traversed allocated resource applications;

using a sum of system resources occupied by the traversed resource applications plus the remaining resources as available resources;

determining, every time one of the allocated resource applications is traversed, whether the available resources meet the resource application;

stopping traversing when the available resources meet the resource application; and allocating the available resources to the resource application.

The allocated resource application having the priority interval same as that of the resource application and the priority level different from that of the resource application includes:

the allocated resource application having the priority interval same as that of the resource application and the priority level lower than that of the resource application.

the allocated resource application having the priority interval same as that of the resource application and the priority level same as that of the resource application; or the allocated resource application having the priority interval same as that of the resource application and the priority level higher than that of the resource application.

Compared with the conventional techniques, the present disclosure has the following advantages:

The present disclosure provides a priority-based resource allocation method, apparatus and device. The resource allocation method, after accepting a resource application submitted by a job, determines, according to resource demand information of the resource application, whether remaining resources of a system meet the resource application, and when the remaining resources do not meet the resource application, sequentially traverses, in an allocated resource application queue, allocated resource applications having job priorities lower than that of the resource application; uses the sum of system resources occupied by all traversed allocated resource applications plus the remaining resources as available resources, and allocates the available resources to the resource application having a high job priority. The technical solution provided in the present disclosure solves the defect in the conventional techniques that a resource application having a high job priority must wait in a queue when system resources are exhausted, such that the resource application having a high job priority obtains, to the maximum extent, resources needed for running.

In addition, in an example embodiment of the present disclosure, second remaining resources of the available resources, which remain after the available resources are allocated to the resource application, are allocated to the allocated resource applications whose resources are occupied, according to a sequence of job priorities from high to low. Thus, the system resources are effectively utilized.

BRIEF DESCRIPTION OF THE DRAWINGS

In order to describe the technical solutions in the example embodiments of the present disclosure or the conventional techniques more clearly, accompanying drawings needed for describing the example embodiments are introduced briefly in the following. It is apparent that the accompanying drawings in the following description are only example embodiments described in the present disclosure.

DETAILED DESCRIPTION

Many specific details are illustrated in the following descriptions to facilitate full understanding of the present disclosure. However, the present disclosure can be implemented in many other manners different from that described herein, and persons of ordinary skill in the art may perform similar promotion without departing from the essence of the present disclosure; therefore, the present disclosure is not limited by specific implementations disclosed in the following.

Example embodiments of the present disclosure provide a priority-based resource allocation method and a priority-based resource allocation apparatus; the example embodiments of the present disclosure also provide an electronic device. The method, apparatus, and electronic device are described in detail one by one in the following example embodiments.

Before specific steps of this example embodiment are described in detail, a running environment of resource allocation involved in this technical solution is described briefly first.

In a distributed system, there are generally three roles: a resource scheduler, a job manager and subordinate job nodes, and machine nodes. When a user needs to submit a job, the job manager may apply for a certain amount of machine resources, such as a CPU and a memory, from the resource scheduler for the job node to use. After receiving a job resource application, the resource scheduler may calculate, according to remaining available resources in the distributed system, a list of available resources that can be allocated to the job manager, for example, a 1-core CPU and 1 GB memory are available on a machine A, and a 2-core CPU and 2 GB memory are available on a machine B. Then, the resource scheduler may send the resource list to the job manager and a corresponding machine node. After receiving the resource list, the job manager may allocate the job node to the corresponding machine node to execute the job program. When execution of the job node is completed, the job manager may notify the resource manager to return resources of the job node, and the resource manager, after receiving a return application, would notify the machine node to release the resources of the job node. The released resources may be reallocated to another job.

Job priorities of resource applications of the job manager are different. When system resources are sufficient, the resource scheduler may meet resource demands of all resource applications, and record, according to a sequence of job priorities from high to low, the resource applications that have been allocated with resources into an allocated resource application queue. In the case where the overall system resources are exhausted, when the resource scheduler receives a resource application having a high job priority, determining how to allocate resources to the resource application having a high job priority is the problem to be solved in the technical solution provided in the present disclosure.

Figure 2:
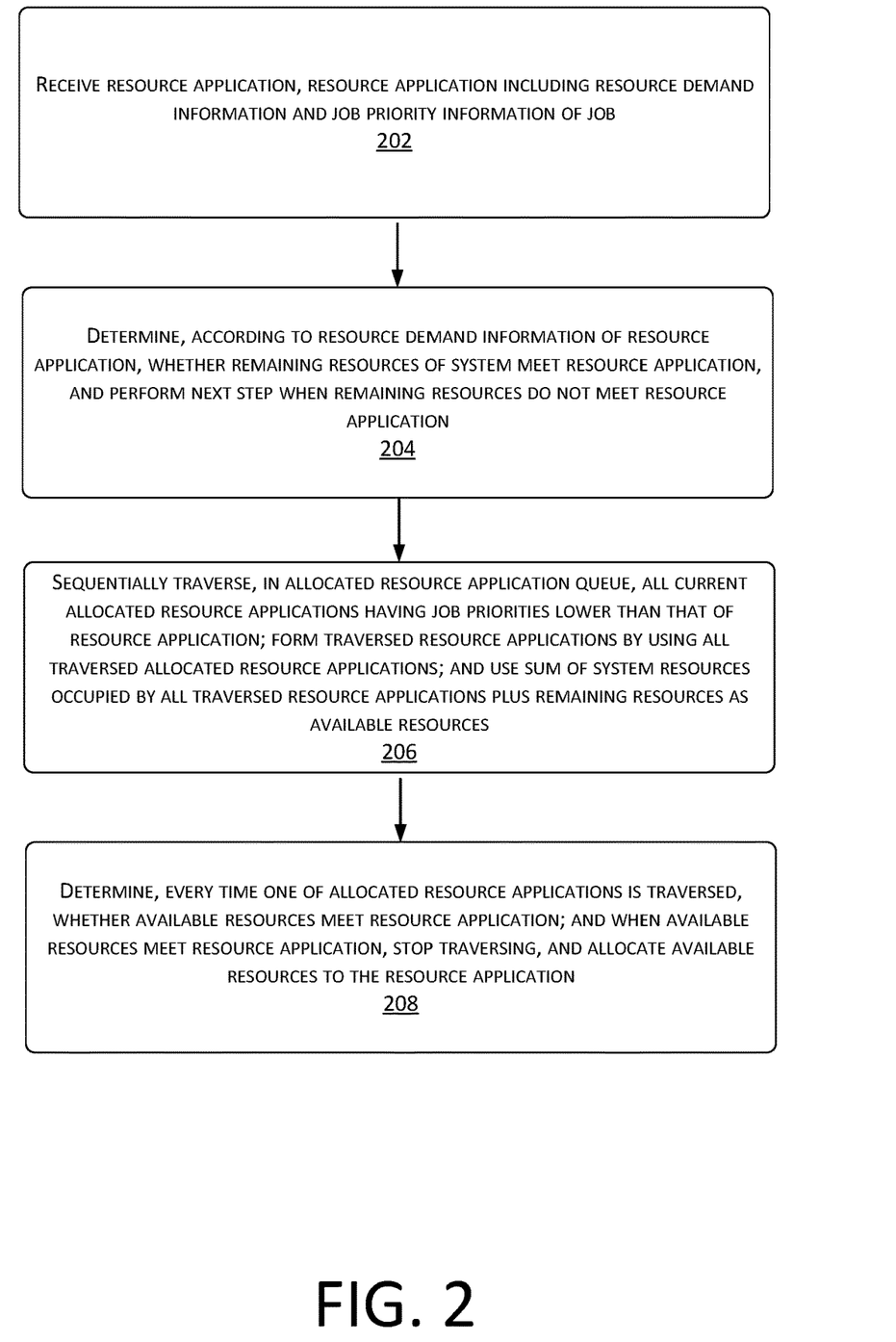
FIG. 2 is a flowchart of a priority-based resource allocation method according to an example embodiment of the present disclosure.

The present disclosure provides a priority-based resource allocation method, and an example embodiment of the resource allocation method is as follows:

FIG. 2 is a flowchart of a priority-based resource allocation method according to an example embodiment of the present disclosure. Step S202, receiving a resource application submitted by a job, the resource application including resource demand information and job priority information.

As described above, when a user needs to submit a job, the user may submit the resource application to the resource scheduler through the job manager. The resource application includes a resource application name, a resource application volume, a resource application quantity, and a job priority.

The resource application name is a label name of the resource application. The resource application name is the same as a label name of the job.

The resource application volume is the minimum resource occupation needed for running the job corresponding to the resource application. The minimum resource occupation is the minimum requirement on a processor, a memory, and the like when the job runs normally in a job node in a distributed system.

The resource application quantity is the quantity of the resource application volumes that the resource application applies for. The resource application quantity may be understood as the quantity of job nodes needed for normally running the job in the distributed system.

For example, 100 CPUs and 100 G memory are needed for running a user job, the user job has 100 job nodes to be executed, and the execution of each job node needs 1 CPU and 1 G memory; therefore, 1 CPU and 1 G memory are the resource application volume, and 100 is the resource application quantity.

The resource application volume and the resource application quantity form the resource demand information of the resource application. A product of the resource application volume and the resource application quantity form a total resource demand amount of the resource application.

The job priority is a definite quantity of priority levels defined by the user; if the priority level is higher, it indicates that the corresponding job is more important, and the resource application should be met more preferentially; if the priority levels are the same, time sequences thereof are compared, and the resource application submitted earlier has a higher priority.

Step S204, determining, according to the resource demand information of the resource application, whether remaining resources of the system meet the resource application, and when the remaining resources do not meet the resource application, performing step S206.

The resource demand information of the resource application includes the resource application volume and the resource application quantity. The resource scheduler compares the resource demand with the size of the remaining resources, and if the remaining resources are less than the resource demand, step S206 is performed.

For example, when the resource scheduler compares the resource demand with the size of the remaining resources, there is another situation, that is, the remaining resources are greater than or equal to the resource demand, and in this case, corresponding resources are allocated to the job according to the resource demand information of the resource application, and the resource application is recorded into an allocated resource application queue as an allocated resource application.

The allocated resource queue is a set of allocated resource applications that have been completely or partially allocated with resources and are arranged according to the job priorities. The allocated resource application includes the resource application name, the resource application volume, an allocated resource quantity, allocated resources, and the job priority;

wherein, the resource application name, the resource application volume, and the job priority are consistent with corresponding items of the resource application; the allocated resource quantity is the quantity of the resource application volumes that have been allocated to the resource application; and the allocated resources are a product of the resource application volume and the allocated resource quantity.

Figure 3:
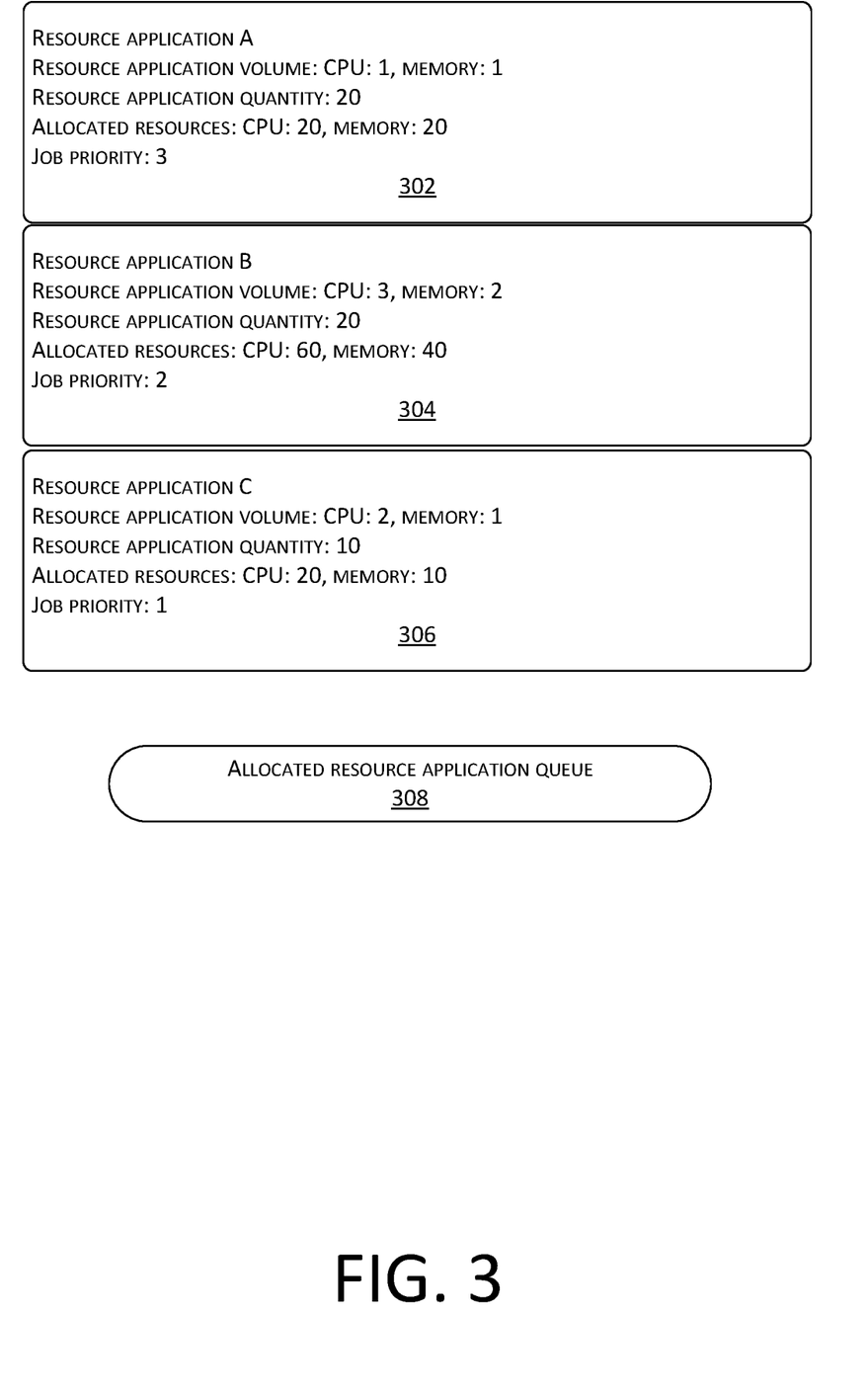
FIG. 3 is a schematic diagram of an allocated resource application queue according to an example embodiment of the present disclosure.

FIG. 3 is a diagram of an allocated resource application queue according to an example embodiment of the present disclosure.

As shown in FIG. 3, the allocated resource queue includes 3 allocated resource applications, and the resource application names are respectively: resource application A, resource application B, and resource application C, wherein other items of the resource application A include:
resource application volume: CPU: 1, memory (MEM): 1
allocated resource quantity: 20
allocated resources: CPU: 20, memory (MEM): 20
job priority: 3

Step S206, sequentially traversing, in the allocated resource application queue, all current allocated resource applications having job priorities lower than that of the resource application; forming traversed resource applications by using all the traversed allocated resource applications, and using the sum of system resources occupied by all the traversed resource applications plus the remaining resources as available resources.

All the current allocated resource applications having job priorities lower than that of the resource application are sequentially traversed according to a sequence of the job priorities from low to high.

An example embodiment of the present disclosure clusters job priorities into different priority intervals according to a set dimension. Each of the priority intervals includes determined priority levels. Moreover, system resources occupied by the allocated resource application cannot be preempted by another resource application in the same priority interval.

In the example embodiment of the present disclosure, when the priority interval is taken into consideration, the sequentially traversing, in the allocated resource application queue, all the current allocated resource applications having job priorities lower than that of the resource application becomes: traversing, in the allocated resource queue according to a sequence of the job priorities from low to high, all the allocated resource applications of which priority intervals are lower than that of the resource application.

In the example embodiment of the present disclosure, the job priorities are classified into 10 levels from low to high, that is, a job priority 1, a job priority 2, . . . , a job priority 10. The 10 levels are clustered into 3 priority intervals according to a sequence of the priorities from low to high: a priority interval I including the job priorities 1, 2, 3, and 4; a priority interval II including the job priorities 5, 6, and 7; a priority interval III including the job priorities 8, 9, and 10. If the job priority of the submitted resource application is 9, when the priority interval is taken into consideration, only the priority interval I and the priority interval II can be traversed, and the allocated resource applications having the job priority 8 will not be traversed.

The example embodiment of the present disclosure, during traversing, will not reclaim system resources occupied by the allocated resource applications that have been traversed, and the system resources are reclaimed only after a final resource allocation solution is determined. In some cases, the resource scheduler may, during traversing, simultaneously reclaim system resources occupied by the allocated resource applications that have been traversed.

Step S208, determining, every time one of the allocated resource applications is traversed, whether the available resources meet the resource application; and when the available resources meet the resource application, stopping traversing, and allocating the available resources to the resource application.

Every time one of the allocated resource applications is traversed, the system may determine whether the available resources meet the resource application:

If the available resources meet the resource application, the traversing is stopped, and the available resources are allocated to the resource application.

If the available resources cannot meet the resource application, the traversing is continued until the available resources meet the resource application.

The operation of stopping traversing and allocating the available resources to the resource application may have two cases. If the available resources just meet the resource demand of the resource application, the allocation ends. If there are second remaining resources after the available resources are allocated to the resource application, that is, system resources remaining after the available resources are allocated to the resource application, the second remaining resources are continuously allocated to the traversed resource applications.

In the example embodiment provided in the present disclosure, the second remaining resources are allocated to the traversed resource applications according to a sequence of the job priorities from high to low.

As an optional solution, there are the following two solutions for processing the available resources:

Solution 1: it is further determined whether the second remaining resources meet any one of the traversed resource applications, if yes, system resources occupied by the traversed resource application are reclaimed first, the available resources are then allocated to the resource application, and the second remaining resources are allocated to any one of the traversed resource applications.

Solution 2, it is further determined whether the second remaining resources meet any one of the traversed resource applications, and if yes, system resources occupied by any one of the traversed resource applications are reserved, and remaining available resources, excluding the resources occupied by any one of the traversed resource applications, are allocated to the resource application.

A difference between the solution 1 and the example embodiment lies in that: in the solution 1, system resources occupied by each traversed allocated resource application are reclaimed first, and then the available resources are allocated; in the example embodiment, the system resources occupied by each traversed allocated resource application will not be reclaimed in advance; instead, the system resources occupied by all the traversed allocated resource applications are reclaimed after an allocation solution is determined.

The solution 2 aims to ensure preferential execution of the traversed resource application that has completely acquired resources needed.

If the available resources still cannot meet the resource application after all the allocated resource applications having low job priorities are traversed, partial resources are allocated to the resource application.

The allocating partial resources to the resource application includes: allocating the remaining resources to the resource application, an unmet part of the resource application entering a to-be-allocated resource application queue to wait for next resource allocation; and allocating the remaining part of the available resources after the available resources are allocated to the resource application to the traversed resource applications according to a sequence of the job priorities from high to low.

The to-be-allocated resource application queue is a set of to-be-allocated resource applications that are completely or partially not allocated with resources and arranged according to the job priorities; the to-be-allocated resource application includes the resource application name, the resource application volume, the resource application quantity, a to-be-allocated resource quantity, and the job priority.

The resource application name, the resource application volume, the resource application quantity, and the job priority are the same as those of the resource application.

The to-be-allocated resource quantity is the quantity of the resource application volumes needed by the unmet part of the resource application.

As an optional solution, when the available resources still cannot meet the resource application after all the allocated resource applications having low job priorities are traversed, system resources occupied by the allocated resource applications may keep unchanged, the remaining resources are allocated to the resource application, and an unmet part of the resource application enters a to-be-allocated resource application queue to wait for next resource allocation.

In the following, the whole process is illustrated by using a specific example with reference to FIG. 3.

Assume that total resources of the system are CPU: 100, memory: 100. The resource application A 302 occupies CPU: 20, memory: 20, has a resource application volume CPU: 1, memory: 1, and a resource application quantity 20, and has a job priority of 3. The resource application B 304 occupies CPU: 60, memory: 40, has a resource application volume: CPU: 3, memory: 2, and a resource application quantity: 20, and has a job priority of 2. The resource application C 306 occupies CPU: 20, memory: 10, has a resource application volume: CPU: 2, memory: 1, and a resource application quantity: 10, and has a job priority of 1. Therefore, remaining resources of the system are CPU: 0, memory: 30.

At this point, a resource application E is received, of which the resource application volume is CPU: 1, memory: 1, the application quantity is 30, and the job priority is 4. As the remaining resources cannot meet the resource application E, the next step is performed to traverse allocated resource applications having job priorities lower than that of the resource application E according to a sequence of the job priorities from low to high in an allocated resource application queue 308. First, the resource application C 306 is traversed, and then, after the traversing, new available resources are CPU: 20 (=0+20), memory: 40 (=30+10). The available resources still cannot meet the resource application E, and therefore, the resource application B 304 is traversed continuously, such that new available resources are CPU: 80 (=20+60), memory: 80 (=40+40). The available resources meet the resource application E, and therefore, the available resources are allocated to the resource application E. After the allocation, remaining available resources, that is, second remaining resources, are CPU: 50 (=80−30), memory 50 (=80−30), and the second remaining resources are reallocated to the traversed resource applications, that is, the resource application B 304 and the resource application C 306, according to a sequence of the job priorities from high to low. The resource application B 304 is checked first, and 16 is obtained after the second remaining resources are divided by a larger resource application volume of all resource application volumes, i.e., 3, of the resource application B 304, that is, system resources that can be allocated to the resource application B 304 are: CPU: 48 (=3*16), memory: 32 (=2*16). System resources remaining after the second remaining resources are allocated, that is, third remaining resources, become: CPU: 2 (=50−48), memory: 18 (=50−32). An unmet part of the resource application B 304, that is, CPU: 12 (=3 *(20−16)), memory: 8 (=2*(20−16)), enters the to-be-allocated resource application queue. Then, the resource application C 306 is checked, and the third remaining resources meet one resource application volume of the resource application C 306. After the third remaining resources are allocated to the one resource application volume of the resource application C, remaining system resources become CPU: 0 (=2−2*1), memory: 17(=18−1*1), and cannot be used for allocation. An unmet part of the resource application C 306, that is, CPU: 18 (=2* (10−1)), memory: 9 (=1*(10−1)), enters the to-be-allocated resource application queue.

The final result is: the resource application E obtains system resources CPU: 30, memory: 30; the resource application B obtains system resources CPU: 48, memory: 32; the resource application C obtains system resources CPU: 2, memory: 1; and the new remaining resources of the system are CPU: 0, memory: 17.

Finally, the resource scheduler will reclaim the resources occupied by the resource application B and the resource application C, and allocate the system resources according to the new solution above.

The example embodiment of the present disclosure provides a priority-based resource allocation method, and corresponding to the priority-based resource allocation method above, the present disclosure further provides a priority-based resource allocation apparatus.

Figure 4:
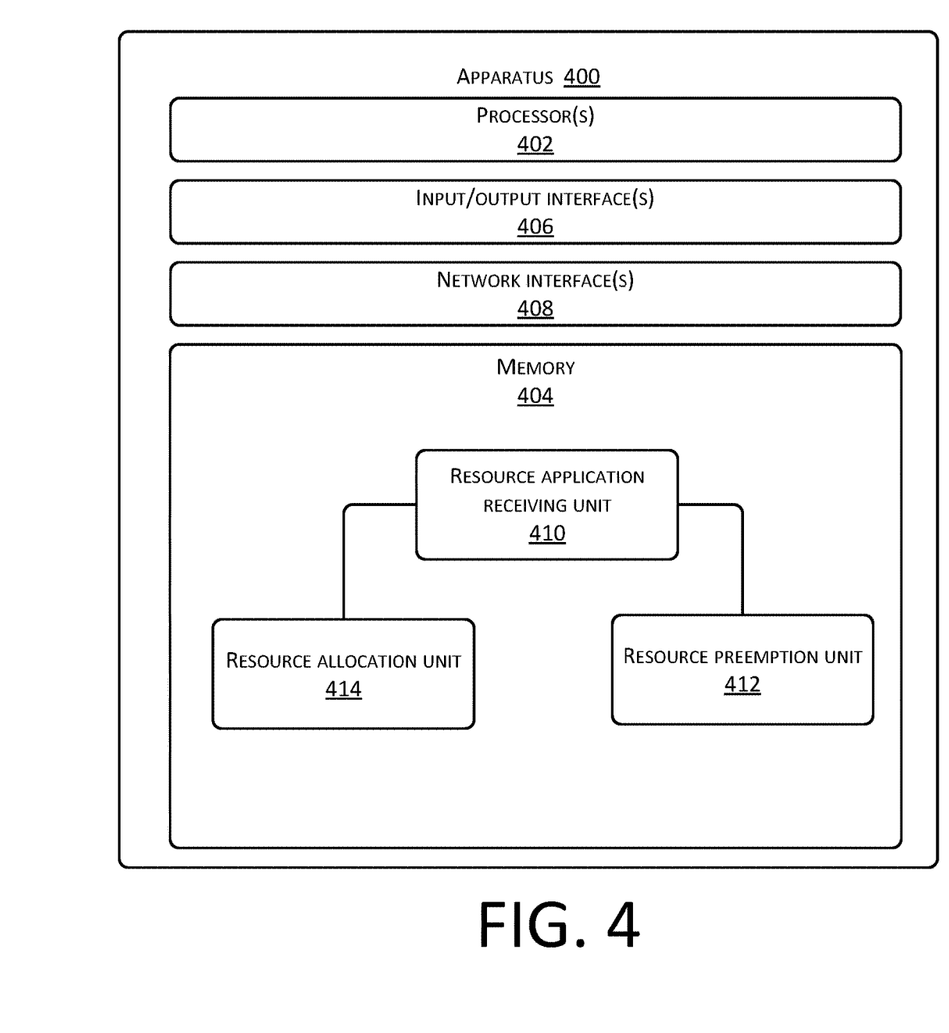
FIG. 4 is a schematic diagram of a priority-based resource allocation apparatus according to an example embodiment of the present disclosure.

FIG. 4 is a schematic diagram of a priority-based resource allocation apparatus 400 according to an example embodiment of the present disclosure.

The apparatus 400 includes one or more processor(s) 402 or data processing unit(s) and memory 404. The apparatus 400 may further include one or more input/output interface(s) 406, and network interface(s) 408. The memory 404 is an example of computer readable media.

The memory 404 may store therein a plurality of modules or units including a resource application receiving unit 410, and a resource preemption unit 412.

The resource application receiving unit 410 is configured to accept a resource application submitted by a job, the resource application including resource demand information and job priority information; determine, according to the resource demand information of the resource application, whether remaining resources of a system meet the resource application; and trigger the resource preemption unit 412 if the remaining resource do not meet the resource application.

The resource preemption unit 412 is configured to traverse, in the allocated resource application queue according to a sequence of the job priorities from low to high, allocated resource applications having job priorities lower than that of the resource application, and reallocate the system resources according to a result after the traversing.

As shown in FIG. 4, the apparatus 400 may further include a resource allocation unit 414 stored on memory 404.

When the resource application receiving unit 410 determines, according to the resource demand information of the resource application, whether remaining resources of the system meet the resource application, if the remaining resources meet the resource application, the resource allocation unit 414 is triggered.

The resource allocation unit 414 is configured to allocate, according to the resource demand information of the job, corresponding resources to the resource application; and record the resource application into the allocated resource application queue as an allocated resource application.

Figure 5:
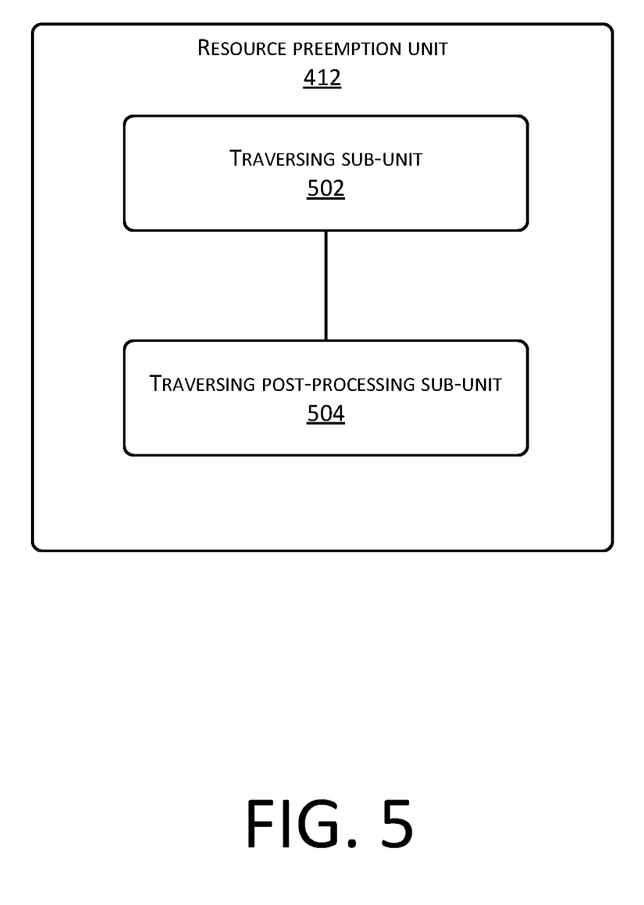
FIG. 5 is a schematic diagram of the resource preemption unit according to an example embodiment of the present disclosure.

FIG. 5 is a schematic diagram of the resource preemption unit 412 according to an example embodiment of the present disclosure.

As shown in FIG. 5, the resource preemption unit 412 includes a traversing sub-unit 502, and a traversing post-processing sub-unit 504.

The traversing sub-unit 502 is configured to traverse, in the allocated resource queue according to a sequence of the job priorities from low to high, the allocated resource applications having job priorities lower than that of the resource application; determine, every time one of the allocated resource applications is traversed, whether the available resources meet the resource application; stop traversing if the available resources meet the resource application, and allocate the available resources to the job; and continue traversing, if the available resources cannot meet the resource application, until the available resources meet the resource application.

The traversing post-processing sub-unit 504 is configured to process a situation in which the available resources still cannot meet the resource application after the traversing.

Optionally, in the traversing sub-unit 502, the stopping traversing if the available resources meet the resource application, and allocating the available resources to the resource application includes:

stopping traversing if the available resources meet the resource application, and allocating the available resources to the resource application; and allocating, according to a sequence of the job priorities from high to low, second remaining resources after the allocation to the traversed resource applications.

Optionally, in the traversing sub-unit 502, the stopping traversing if the available resources meet the resource application, and allocating the available resources to the resource application includes:

stopping traversing if the available resources meet the resource application, and further determining whether the second remaining resources meet any one of the traversed resource applications, if yes, allocating the available resources to the resource application, and allocating the second remaining resources to any one of the traversed resource applications.

Optionally, in the traversing sub-unit 502, the stopping traversing if the available resources meet the resource application, and allocating the available resources to the resource application includes:

stopping traversing if the available resources meet the resource application, and further determining whether the second remaining resources meet any one of the traversed resource applications, if yes, allocating remaining available resources, excluding resources occupied by any one of the traversed resource applications, to the resource application.

Optionally, the traversing post-processing sub-unit 504 is configured to:

allocate the available resources to the resource application when the available resources still cannot meet the resource application after all the allocated resource applications having low job priorities are traversed, an unmet part of the resource application entering a to-be-allocated resource application queue to wait for next resource allocation; and allocate the remaining part of the available resources after the available resources are allocated to the resource application to the allocated traversed resource applications, of which resources are preempted, according to a sequence of the job priorities from high to low.

Optionally, the traversing post-processing sub-unit 504 is configured to:

keep system resources occupied by the allocated resource applications unchanged, and allocate the remaining resources to the resource application when the available resources still cannot meet the resource application after all the allocated resource applications having low job priorities are traversed, an unmet part of the resource application entering the to-be-allocated resource application queue to wait for next resource allocation.

Figure 6:
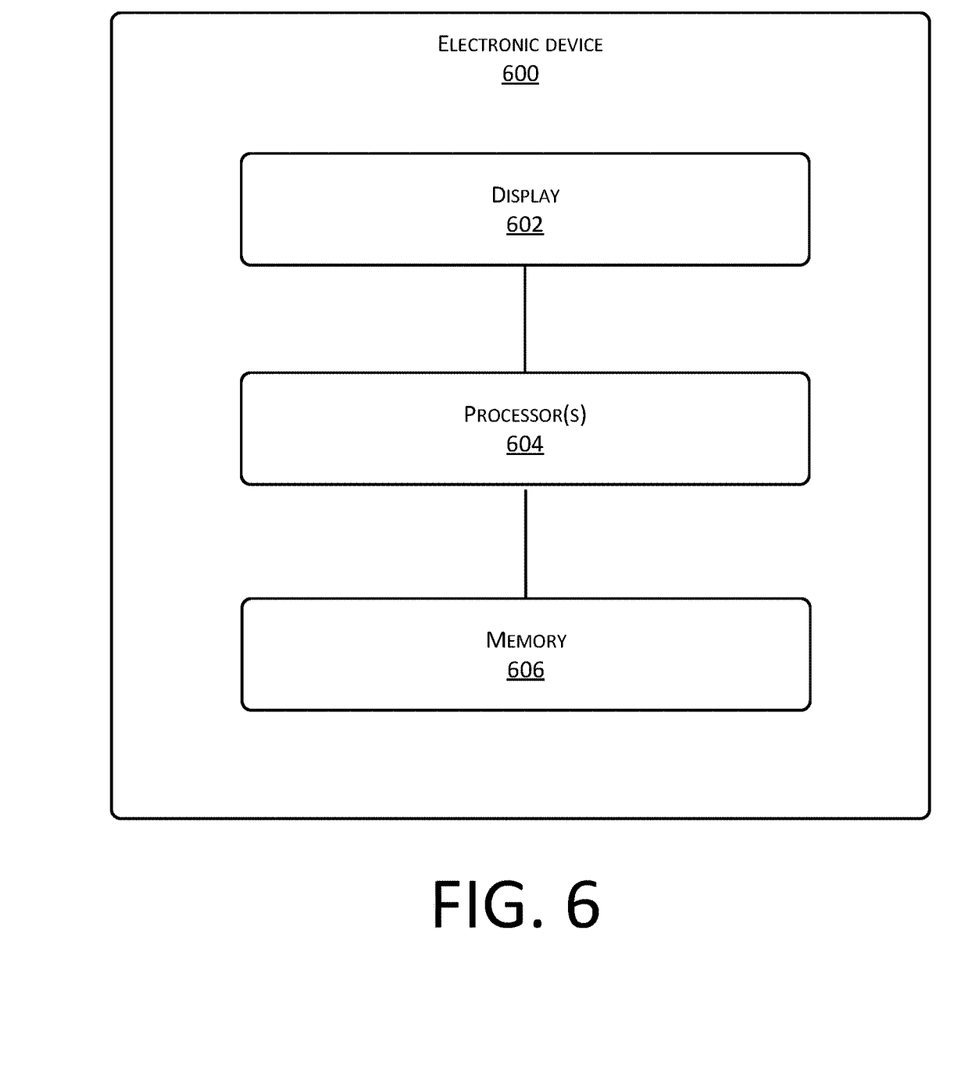
FIG. 6 is a schematic diagram of an electronic device according to an example embodiment of the present disclosure.

The above example embodiments provide a priority-based resource allocation method and a priority-based resource allocation apparatus. Moreover, the present disclosure further provides an electronic device, and an example embodiment of the electronic device is described as follows:

FIG. 6 is a schematic diagram of an electronic device 600 according to an example embodiment of the present disclosure.

The electronic device 600 includes: a display 602, one or more processor(s) 604 or data processing unit(s) and memory 606. The electronic device 600 may further include one or more input/output interface(s) and network interface(s), not shown in FIG. 6

The memory 606 is configured to store a priority-based resource allocation program, the program, when being read and executed by the processor, performing the following operations:

accepting a resource application submitted by a job, the resource application including resource demand information and job priority information;

determining, according to the resource demand information of the resource application, whether remaining resources of a system meet the resource application, and if yes, allocating corresponding resources to the job according to the resource demand information of the resource application; and recording the resource application into an allocated resource application queue as an allocated resource application;

if no, traversing, in the allocated resource application queue according to a sequence of job priorities from low to high, the allocated resource applications having job priorities lower than that of the resource application; and forming traversed resource applications by using all the traversed allocated resource applications, and using the sum of system resources occupied by all the traversed resource applications plus the remaining resources as available resources; determining, every time one of the allocated resource applications is traversed, whether the available resources meet the resource application; stopping traversing if the available resources meet the resource application, and allocating the available resources to the resource application; continuing traversing, if the available resources cannot meet the resource application, until the available resources meet the resource application; or continuing traversing till all the allocated resource applications having low job priorities are traversed, and allocating resources to the resource application.

In a typical configuration, a computer device includes one or more processors (CPUs), input/output interfaces, network interfaces, and memories.

The memory may include a volatile memory, a random access memory (RAM) and/or a non-volatile memory or the like in a computer readable medium, for example, a read-only memory (ROM) or a flash RAM. The memory is an example of the computer readable medium.

The computer readable medium includes non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to a computation device. According to the definition of this text, the computer readable medium does not include transitory media, such as a modulated data signal and a carrier.

Persons of ordinary skill in the art should understand that, the example embodiments of the present disclosure may be provided as a method, a system, or a computer program product. Therefore, the present disclosure may be implemented as a complete hardware example embodiment, a complete software example embodiment, or an example embodiment combining software and hardware. Moreover, the present disclosure may be a computer program product implemented on one or more computer usable storage media (including, but not limited to, a magnetic disk memory, a CD-ROM, an optical memory, and the like) including computer usable program code.

The present disclosure is disclosed in the example embodiments in the foregoing, but they are not intended to limit the present disclosure, and any persons skilled in the art can make possible variations and modifications without departing from the spirit and scope of the present disclosure. Therefore, the protection scope of the present disclosure should be subject to the scope defined by the claims of the present disclosure.

What is claimed is:

1. A method implemented in a distributed system, comprising:
receiving a first resource application, the first resource application being one of a plurality of resource applications, and a respective resource application of the plurality of resource applications having a respective resource demand, a respective priority interval, and a respective priority level, the first resource application including job priority information of a job and resource demand information based on a resource quantity and a resource volume, the job priority information including a first priority level and a first priority interval including the first priority level, wherein job priorities are clustered into different priority intervals according to a set dimension, the respective priority interval including at least two priority levels;
determining, according to the resource demand information based on the resource quantity and the resource volume of the first resource application, whether remaining resources in the distributed system meet the first resource application;
sequentially traversing, in an allocated resource application queue, allocated resource applications based on resource quantities and resource volume of the allocated resource applications, the allocated resource applications having job priorities in priority intervals lower than the first priority interval of the first resource application in response to determining that the remaining resources in the distributed system do not meet the first resource application, the allocated resource applications being resource applications that have been completely or partially allocated with resources;
determining not to preempt or traverse an allocated resource application having the first priority interval and a second priority level lower than the first priority level of the first resource application;
forming traversed resource applications by using traversed allocated resource applications based on resource quantities and resource volume of the traversed allocated resource applications;
using a sum of system resources occupied by the traversed resource applications plus the remaining resources as available resources;
determining, every time one of the allocated resource applications is traversed, whether the available resources meet the first resource application;
stopping traversing when the available resources meet the first resource application;
allocating the available resources to the first resource application; and
when the available resources has been allocated to the first resource application, reallocating any remaining resources to the traversed allocated resource applications, according to a sequence of job priorities of the allocated resource applications from high to low, based on the resource quantities and the resource volume of the traversed allocated resource applications; and entering an unmet part of the traversed allocated resource applications, based on the resource quantities and the resource volume of the traversed allocated resource applications, into a to-be-allocated resource application queue.

2. The method of claim 1, further comprising:
allocating corresponding resources to the job according to the resource demand information of the first resource application, in response to determining that the remaining resources meet the first resource application; and
recording the first resource application into the allocated resource application queue as one of the allocated resource applications.

3. The method of claim 1, further comprising:
continuing traversing, when the available resources do not meet the first resource application, until the available resources meet the first resource application.

4. The method of claim 1, wherein determining, every time one of the allocated resource applications is traversed, whether the available resources meet the first resource application further includes:
allocating partial resources to the first resource application in response to determining that the available resources still do not meet the first resource application after the allocated resource applications having low job priorities are traversed.

5. The method of claim 4, wherein allocating the partial resources to the first resource application includes:
allocating the remaining resources to the first resource application, an unmet part of the first resource application entering the to-be-allocated resource application queue to wait for a next resource allocation.

6. The method of claim 4, wherein allocating the partial resources to the first resource application includes, when the available resources still do not meet the first resource application after the allocated resource applications having low job priorities are traversed:
keeping system resources occupied by the allocated resource applications unchanged; and
allocating the remaining resources to the first resource application, an unmet part of the first resource application entering the to-be-allocated resource application queue to wait for a next resource allocation.

7. The method of claim 1, wherein:
the respective resource application includes a respective resource application name, a respective resource application volume, a respective resource application quantity, and a respective job priority;
the respective resource application name is a label name of the respective resource application;
the respective resource application volume is a minimum resource occupation needed for running the job corresponding to the respective resource application;
the respective resource application quantity is a quantity of the respective resource application volume that the respective resource application applies for; and
the respective job priority is a quantity of priority levels defined by a user.

8. The method of claim 7, wherein:
a higher priority level indicates that a corresponding job is more important and a corresponding resource application should be met more preferentially; and when priority levels are the same, a resource application submitted earlier in a time sequence is met more preferentially.

9. The method of claim 1, wherein:
each of the priority intervals includes determined priority levels.

10. The method of claim 1, wherein sequentially traversing, in the allocated resource application queue based on resource quantities of the allocated resource applications further includes:
traversing, in the allocated resource queue, according to a sequence of the job priorities of the allocated resource applications from low to high, the allocated resource applications having the job priorities in priority intervals lower than the first priority interval of first the resource application.

11. The method of claim 1, wherein the allocated resource queue is a set of allocated resource applications that are arranged according to a sequence of the job priorities.

12. One or more memories in a distributed system, the one or more memories storing thereon computer-readable instructions that, when executed by one or more processors, cause the one or more processors to perform acts comprising:
receiving a first resource application, the first resource application being one of a plurality of resource applications, and a respective resource application of the plurality of resource applications having a respective resource demand, a respective priority interval, and a respective priority level, the first resource application including job priority information of a job and resource demand information based on a resource quantity and a resource volume, the job priority information including a first priority level and a first priority interval including the first priority level, wherein job priorities are clustered into different priority intervals according to a set dimension, the respective priority interval including at least two priority levels;
determining, according to the resource demand information based on the resource quantity and the resource volume of the first resource application, whether remaining resources in the distributed system meet the first resource application;
sequentially traversing, in an allocated resource application queue, allocated resource applications based on resource quantities and resource volume of the allocated resource applications, the allocated resource applications having job priorities in priority intervals lower than the first priority interval of the first resource application in response to determining that the remaining resources in the distributed system do not meet the first resource application, the allocated resource applications being resource applications that have been completely or partially allocated with resources;
determining not to preempt or traverse an allocated resource application having the first priority interval and a second priority level lower than the first priority level of the first resource application;
forming traversed resource applications by using traversed allocated resource applications based on resource quantities and resource volume of the traversed allocated resource applications;
using a sum of system resources occupied by the traversed resource applications plus the remaining resources as available resources;

determining, every time one of the allocated resource applications is traversed, whether the available resources meet the first resource application;
stopping traversing when the available resources meet the first resource application;
allocating the available resources to the first resource application; and
when the available resources has been allocated to the first resource application, reallocating any remaining resources to the traversed allocated resource applications, according to a sequence of job priorities of the allocated resource applications from high to low, based on the resource quantities and the resource volume of the traversed allocated resource applications; and entering an unmet part of the traversed allocated resource applications, based on the resource quantities and the resource volume of the traversed allocated resource applications, into a to-be-allocated resource application queue.

13. An electronic device implemented in a distributed system comprising:
one or more processors; and
one or more memories stored thereon a priority-based resource allocation program that, when executed by the processor, performing operations comprising:
receiving a first resource application, the first resource application being one of a plurality of resource applications, and a respective resource application of the plurality of resource applications having a respective resource demand, a respective priority interval, and a respective priority level, the first resource application including job priority information of a job and resource demand information based on a resource quantity and a resource volume, the job priority information including a first priority level and a first priority interval that includes the first priority level, wherein job priorities are clustered into different priority intervals according to a set dimension, the respective priority interval including at least two priority levels;
determining, according to the resource demand information based on the resource quantity and a resource volume of the first resource application, whether remaining resources in the distributed system meet the first resource application;
sequentially traversing, in an allocated resource application queue, allocated resource applications based on resource quantities and resource volume of the allocated resource applications, the allocated resource applications having priority intervals lower than the priority interval of the first resource application in response to determining that the remaining resources in the distributed system do not meet the first resource application, the allocated resource applications being resource applications that have been completely or partially allocated with resources;
determining not to preempt or traverse an allocated resource application having the first priority interval and a second priority level lower than the first priority level of the first resource application;
forming traversed resource applications by using traversed allocated resource applications based on resource quantities and resource volume of the traversed allocated resource applications;
using a sum of system resources occupied by the traversed resource applications plus the remaining resources as available resources;

determining, every time one of the allocated resource applications is traversed, whether the available resources meet the first resource application;

stopping traversing when the available resources meet the first resource application;

allocating the available resources to the first resource application; and when the available resources has been allocated to the first resource application, reallocating any remaining resources to the traversed allocated resource applications, according to a sequence of job priorities of the allocated resource applications from high to low, based on the resource quantities and the resource volume of the traversed allocated resource applications; and entering an unmet part of the traversed allocated resource applications, based on the resource quantities and the resource volume of the traversed allocated resource applications, into a to-be-allocated resource application queue.

14. The electronic device of claim 13, the operations further comprising:

allocating corresponding resources to the job according to the resource demand information of the first resource application, in response to determining that the remaining resources meet the first resource application; and recording the first resource application into the allocated resource application queue as one of the allocated resource applications.

15. The electronic device of claim 13, the operations further comprising:

continuing traversing, when the available resources do not meet the first resource application, until the available resources meet the first resource application.

16. The electronic device of claim 13, wherein determining, every time one of the allocated resource applications is traversed, whether the available resources meet first the resource application further includes:

allocating partial resources to the first resource application in response to determining that the available resources still do not meet the first resource application after the allocated resource applications having low job priorities are traversed.

17. The electronic device of claim 16, wherein allocating the partial resources to the first resource application includes:

allocating the remaining resources to the first resource application, an unmet part of the first resource application entering the to-be-allocated resource application queue to wait for a next resource allocation.

\* \* \* \* \*